Aug. 18, 1942.　　　H. M. BEYREIS　　　2,293,680
LATHE TOOL
Filed Jan. 30, 1942
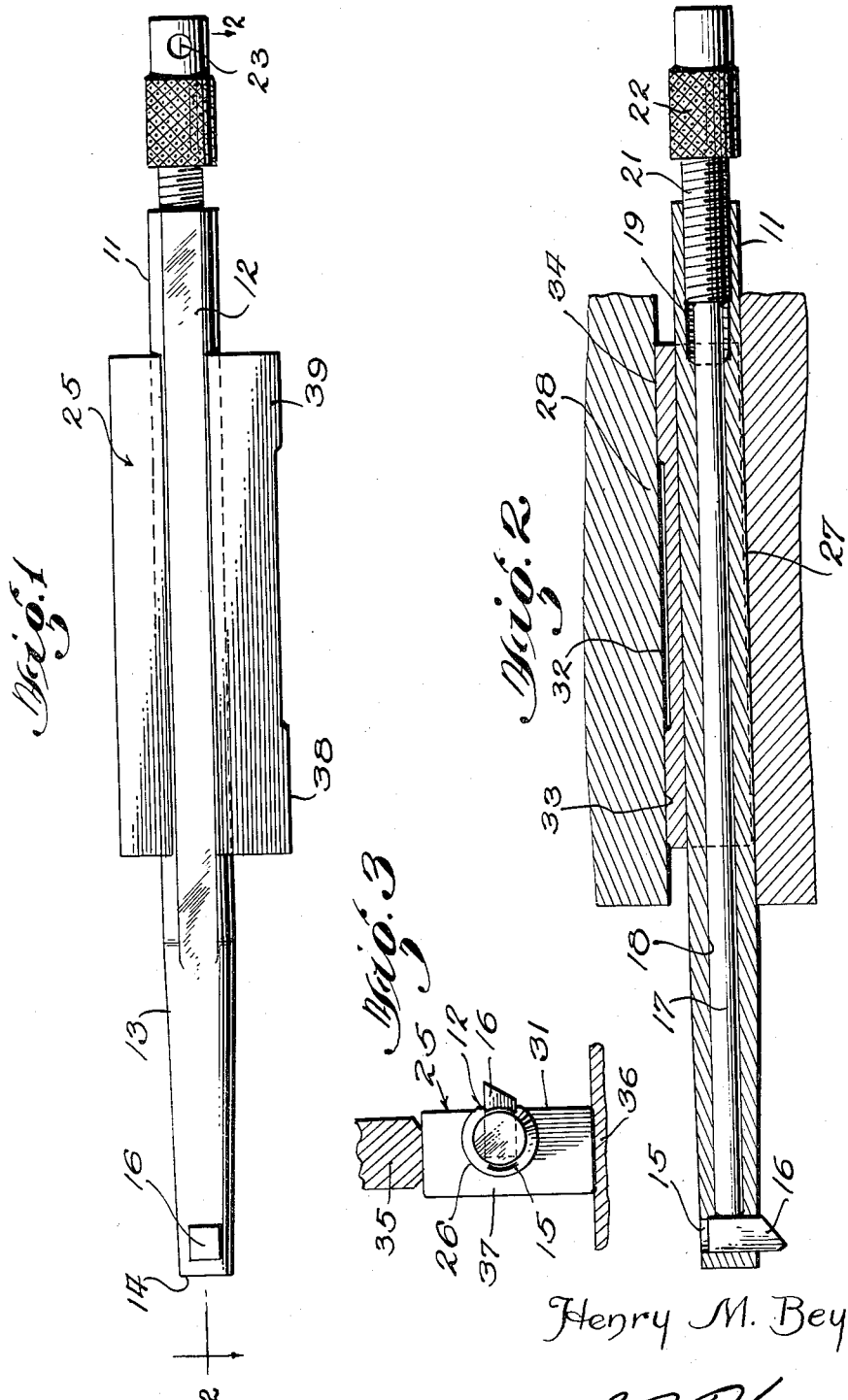
Inventor
Henry M. Beyreis
By L. F. Hammand
Attorney Patented Aug. 18, 1942

2,293,680

UNITED STATES PATENT OFFICE 2,293,680

LATHE TOOL

Henry M. Beyreis, United States Army

Application January 30, 1942, Serial No. 428,800

6 Claims. (Cl. 77—56)

(Granted under the act of March 3, 1883, as amended April 30, 1928; 370 O. G. 757)

The invention described herein, if patented, may be manufactured and used by or for the Government for governmental purposes without the payment to me of any royalty thereon.

The present invention relates to a lathe tool, and more particularly to a boring bar designed for internal cutting.

One of the principal objects of the invention is to provide a lathe tool of peculiar construction and arrangement and particularly adapted to rigidly support a relatively small tool steel bit while cutting internal screw threads, etc.

A further object of the invention is to provide a novel and improved lathe tool including a boring bar having a central rod therein and so arranged that a tool steel cutting bit may be mounted at one end of the bar and clamped in position by clamping mechanism in an accessible position at the opposite end of the bar.

A further object of the invention is to provide a lathe tool including a cutting bit, boring bar, and bar mounting device, the boring bar and mounting being so designed and constructed as to cooperate with the tool holder of a lathe or similar machine to maintain the cutting tube in predetermined fixed position.

A further object of the invention is to provide a boring bar having a substantially cylindrical body with a tapered end portion adapted to enter a drilled opening in the work, the tapered end of the boring bar being provided with a tool steel cutting bit adjustably clamped in position by clamping mechanism at the opposite end of the bar.

A further object of the invention is to provide a novel combination of boring bar and boring bar block mounting adapted to cooperate with each other to maintain the boring bar in fixed position between clamping surfaces of the tool post of a lathe.

A further object of the invention is to provide a boring bar of generally cylindrical configuration including a smooth flat surface on one side thereof in combination with a rectangular mounting block arranged to encircle the cylindrical portions of the surface of the bar and leave the flat portion thereof exposed, whereby it may be clamped into fixed engagement with clamping surfaces of the lathe tool holder.

Referring now more particularly to the drawing:

Fig. 1 is a side elevation of a lathe tool assembly constructed in accordance with the teachings of the present disclosure.

Fig. 2 is a central sectional view of the tool illustrated in Fig. 1, showing the several parts thereof in their operative relationship with the clamping surfaces of the tool holder of a lathe.

Fig. 3 is an end elevational view.

The lathe tool consists of a boring bar 11 of generally cylindrical shape but including a flat-faced surface 12 along one of its sides and having a tapered portion 13 terminating in a reduced diameter end portion 14.

A transverse square socket 15 is provided adjacent the small end 14 of the boring bar and the socket 15 is arranged to receive a hardened tool steel cutting bit 16.

The bit 16 is approximately square in cross-section, and is arranged to fit closely within the socket 15. Its projection from the socket may be adjusted by advancing it from or withdrawing it into the socket of the boring bar.

The bit 16 is rigidly clamped into position within the socket by means of a longitudinal clamping rod 17, which is arranged to extend through a cylindrical bore 18 of the boring bar to a point adjacent the opposite end of the bar. The central bore 18 is counter-bored at the end of the bar opposite the bit 16 and is threaded at 19 to receive the screw-threaded shank 21 of a thumbscrew 22. The screw head is knurled to facilitate tightening by hand, but it is also provided with a drilled opening 23 so that a tool may be inserted to increase the clamping action of the screw. It will be understood, of course, that in operation the bit 16 is rigidly clamped in position by tightening the knurled thumbscrew 22 since this action will cause the end of the screw-threaded portion 21 of the screw to force the clamping rod 17 into firm engagement with the bit.

The boring bar 11 is arranged to be supported in a substantially rectangular mounting block 25 having a cavity 26 provided therein to receive the boring bar. It will be noted that the cavity 26 is of cylindrical shape and of proper size to snugly fit the boring bar. It is not centrally located in the block 25, but is so positioned that one side of the boring bar 11 is exposed on the side of the mounting block, in order that the flat-faced surface 12 of the boring bar may be placed in firm engagement against the surface of the tool mounting structure of a lathe; for example, the surface indicated by the numeral 27.

It should be pointed out at this time that the tool mounting structures, such as the surface 27, and the surface 28 cooperating therewith (and the surfaces 35 and 36 hereinafter described), are illustrated as representative of any types of tool clamping arrangements commonly used in the machine tool art, and have been illustrated in their present form only for purposes of convenience in the description of the invention. It should be understood that these surfaces may take any one of various forms and may consist of two parallel clamping surfaces, as illustrated, or may be set-screws, wedges, or other devices commonly used in the art. Inasmuch as the surfaces of the clamping mechanism or tool holder form a part of any one of several well known types of machines and do not form a part of the present invention except in combination with the other structure illustrated, they will not be shown in greater detail in this application.

It should be carefully noted that the shape and relationship of the tool holder and mounting block are such that the flat surface 12 of the tool holder projects slightly from the plane of the flat surface 31 of the mounting block, so that when the assembly of boring bar and mounting block are clamped in the tool holder of the lathe the bar itself will be held in firm relationship with the tool holder and will thus effectively resist any tendency to shift responsive to forces incident to the operation of the tool. The provision of the flat side 12 on the boring bar 11 also makes it possible to utilize a relatively large boring bar in a tool post of standard width, to afford greater rigidity to the mounting for the cutting bit. It should also be noted that the tool holder or mounting block 25 is relieved at the point 32 so that the clamping force exerted between the surfaces 27 and 28 will be concentrated at the ends 33 and 34 of the mounting block, and, of course, at corresponding points with respect to the boring bar 11. This construction provides, in effect, a two-point suspension of the boring bar with the points 33 and 34 spaced apart from each other a distance sufficient to give great rigidity to the mounting bar and enabling the operator to take relatively heavy cuts of metal without danger of shifting or chattering of the tool.

The mounting block 25 is also arranged to exert an additional clamping action in response to forces applied by setscrews or other clamping means above and below the mounting block at the points 35 and 36. In this connection, it will be noted that the mounting block 25 includes a relatively thin structure at the point 37 adjacent the cavity 26 and when vertical pressure is applied to the surfaces of the mounting block the thin portion 37 will flex sufficiently so that the entire interior cylindrical surface of the cavity 26 is clamped into firm engagement with the exterior surface of the boring bar. The lower surface of the mounting block 25 is relieved to concentrate the effective clamping action of the device at the opposite ends corresponding to the finished surfaces 38 and 39, and thus add to the rigidity of the mounting.

From the foregoing, it will be apparent that by following the teachings of the present disclosure, it is possible to provide a novel and improved lathe tool including improved means for adjustably securing a cutting bit at the remote end of a boring bar, and a novel mounting arrangement for the boring bar arranged to give maximum rigidity, to prevent chattering, and provide maximum operating efficiency, while at the same time maintaining the advantages of an easily adjustable structure that may be easily and quickly applied to or removed from the tool holder of any ordinary type of lathe.

While I have shown and described a preferred embodiment of the invention, it is capable of numerous modifications without departing from the invention spirit, and I therefore wish to be limited only by the scope of the appended claims.

Having thus described my invention, what is claimed as new and desired to secure by Letters Patent is:

1. A boring bar consisting of a relatively long cylindrical bar having a relatively flat surface on one side thereof, a transverse socket in said bar adjacent one end thereof, a central longitudinal bore extending through said bar, a screw-threaded clamping element longitudinally extending into said bar at the end opposite the tool socket, and a longitudinal clamping rod extending between the screw-threaded clamping screw and the tool socket and adapted to clamp a cutting bit in the tool socket responsively to the force exerted by the clamping screw; in combination with mounting means comprising a substantially rectangular block having a semi-cylindrical cavity extending therethrough, said cavity being of a size to snugly engage the exterior surfaces of the boring bar and intersecting one of the flat surfaces of the mounting block in such a manner that the flat surface of the boring bar will project beyond the flat surface of the mounting block to the end that when said mounting block and bar are clamped between cooperating clamping surfaces a clamping force will be exerted directly on the flat surfaces of the boring bar.

2. A boring bar consisting of a relatively long cylindrical boring bar, the said boring bar including a relatively flat surface on one side thereof; in combination with a mounting block comprising a substantially rectangular block having a semi-cylindrical cavity extending therethrough, said cavity being of a size to snugly engage the exterior surfaces of the boring bar and intersecting one of the flat surfaces of the mounting block in such a manner that the flat surface of the boring bar will project beyond the flat surface of the mounting block to the end that when said mounting block and bar are clamped between cooperating clamping surfaces a clamping force will be exerted directly on the flat surfaces of the boring bar.

3. A boring bar consisting of a relatively long cylindrical boring bar, the said boring bar including a relatively flat surface on one side thereof; in combination with a mounting block comprising a substantially rectangular block having a semi-cylindrical cavity extending therethrough, said cavity being of a size to snugly engage the exterior surfaces of the boring bar and intersecting one of the flat surfaces of the mounting block in such a manner that the flat surface of the boring bar will project beyond the flat surface of the mounting block to the end that when said mounting block and bar are clamped between cooperating clamping surfaces a clamping force will be exerted directly on the flat surfaces of the boring bar, said mounting block also including a relatively thin area adjacent the cylindrical cavity whereby minute flexing responsive to clamping action exerted on the opposite surfaces of the block will cause the cylindrical surfaces of the block cavity to be urged into clamping relationship against the exterior cylindrical surfaces of the boring bar.

4. A boring bar consisting of a relatively long cylindrical bar having a tapered end portion terminating in a reduced cutting end, a transverse socket in said bar adjacent the reduced end, a central longitudinal bore extending through said bar, a screw-threaded clamping element longitudinally extending into said bar at the end opposite the tool socket, and a longitudinal clamping rod extending between the screw-threaded clamping screw and the tool socket and adapted to clamp a cutting bit in the tool socket responsively to the force exerted by the clamping screw; the said boring bar including a relatively flat exterior surface on one side thereof, adapted to cooperate with and be clamped in flat face-to-face relation with a mounting block to secure the bar in fixed position.

5. A boring bar consisting of a relatively long cylindrical bar having a tapered end portion terminating in a reduced cutting end, a transverse socket in said bar adjacent the reduced end, a central longitudinal bore extending through said bar, a screw-threaded clamping element longitudinally extending into said bar at the end opposite the tool socket, and a longitudinal clamping rod extending between the screw-threaded clamping screw and the tool socket and adapted to clamp a cutting bit in the tool socket responsively to the force exerted by the clamping screw; in combination with a mounting block comprising a substantially rectangular block having a semi-cylindrical cavity extending therethrough, said cavity being of a size to snugly engage the exterior surfaces of the boring bar and intersecting to one surface of the mounting block, said mounting block including a relatively thin area adjacent the cylindrical cavity whereby minute flexing responsive to clamping action exerted on the opposite surfaces of the block will cause the cylindrical surfaces of the block cavity to be urged into clamping relationship against the exterior cylindrical surfaces of the boring bar.

6. A boring bar consisting of a relatively long cylindrical bar having a relatively flat surface on one side thereof and a tapered end portion terminating in a reduced cutting end, a transverse socket in said bar adjacent the reduced end, a central longitudinal bore extending through said bar, a screw-threaded clamping element longitudinally extending into said bar at the end opposite the tool socket, and a longitudinal clamping rod extending between the screw-threaded clamping screw and the tool socket and adapted to clamp a cutting bit in the tool socket responsively to the force exerted by the clamping screw; in combination with mounting means comprising a substantially rectangular block having a semi-cylindrical cavity extending therethrough, said cavity being of a size to snugly engage the exterior surfaces of the boring bar and intersecting one of the flat surfaces of the mounting block in such a manner that the flat surface of the boring bar will project beyond the flat surface of the mounting block, to the end that when said mounting block and bar are clamped between cooperating clamping surfaces, a clamping force will be exerted directly on the flat surfaces of the boring bar; said mounting block also including a relatively thin area adjacent the cylindrical cavity whereby minute flexing responsive to clamping action exerted on the opposite surfaces of the block will cause the cylindrical surfaces of the block cavity to be urged into clamping relationship against the exterior cylindrical surfaces of the boring bar.

HENRY M. BEYREIS.